US010941975B2

(12) United States Patent
Choi et al.

(10) Patent No.: US 10,941,975 B2
(45) **Date of Patent: *Mar. 9, 2021**

(54) DOOR FOR HOME APPLIANCE, HOME APPLIANCE, AND METHOD FOR MANUFACTURING THE SAME

(71) Applicant: LG ELECTRONICS INC., Seoul (KR)

(72) Inventors: Kwanghyun Choi, Seoul (KR); Hyungkyu Park, Seoul (KR); Myeongha Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,631

(22) Filed: Nov. 15, 2019

(65) Prior Publication Data

US 2020/0080766 A1 Mar. 12, 2020

Related U.S. Application Data

(63) Continuation of application No. 16/252,389, filed on Jan. 18, 2019, now Pat. No. 10,502,479, which is a (Continued)

(30) Foreign Application Priority Data

Jul. 15, 2015 (KR) ........................ 10-2015-0100427

(51) Int. Cl.
*F25D 23/02* (2006.01)
*B29C 44/58* (2006.01)
(Continued)

(52) U.S. Cl.
CPC .......... *F25D 23/028* (2013.01); *A47F 3/0434* (2013.01); *B29C 44/588* (2013.01); (Continued)

(58) Field of Classification Search
CPC ...... F25D 23/028; F25D 23/02; F25D 23/025; F25D 2323/023; F25D 2201/10; A47F 3/0434
See application file for complete search history.

(56) References Cited

U.S. PATENT DOCUMENTS 4,583,796 A * 4/1986 Nakajima .............. F25D 23/02 312/405
9,046,294 B2 * 6/2015 Lee ........................ F25D 23/04
(Continued)

FOREIGN PATENT DOCUMENTS

CN 101824953 9/2010
CN 102032747 4/2011
(Continued)

OTHER PUBLICATIONS

Chinese Office Action in CN 201680002237.0 dated Aug. 30, 2018.
(Continued)

*Primary Examiner* — Daniel J Rohrhoff
(74) *Attorney, Agent, or Firm* — KED & Associates LLP

(57) ABSTRACT

A door for a home appliance, a home appliance, and a method for manufacturing the same, are disclosed. The door for a home appliance comprises a panel assembly; and a frame assembly defining a predetermined space having an opening connected with an edge of the panel assembly, and making a foaming space for receiving a thermal insulator by means of the predetermined space of the frame assembly and the edge of the panel assembly, wherein a foaming injection hole through which the thermal insulator is injected is provided on at least one of ends of an upper surface, a lower surface, a left side and a right side of the frame assembly.

29 Claims, 6 Drawing Sheets

Related U.S. Application Data continuation of application No. 15/310,173, filed as application No. PCT/KR2016/007764 on Jul. 15, 2016, now Pat. No. 10,228,182.

(51) Int. Cl.

| | |
|---|---|
| ***A47F 3/04*** | (2006.01) |
| ***F25D 23/06*** | (2006.01) |
| ***B29L 31/00*** | (2006.01) |
| ***B29K 75/00*** | (2006.01) |
| ***B29C 44/18*** | (2006.01) |

(52) U.S. Cl.

CPC ........... *F25D 23/02* (2013.01); *F25D 23/025* (2013.01); *F25D 23/065* (2013.01); *B29C 44/188* (2013.01); *B29K 2075/00* (2013.01); *B29L 2031/7622* (2013.01); *F25D 2201/10* (2013.01); *F25D 2323/023* (2013.01); *F25D 2400/361* (2013.01)

(56) References Cited

U.S. PATENT DOCUMENTS

| | | | | |
|---|---|---|---|---|
| 9,863,693 | B2 * | 1/2018 | Seo | F21V 14/003 |
| 9,976,799 | B2 | 5/2018 | Seo | |
| 10,228,182 | B2 * | 3/2019 | Choi | F24C 15/34 |
| 10,502,479 | B2 * | 12/2019 | Choi | A47F 3/0434 |
| 2006/0265960 | A1 * | 11/2006 | Leimkuehler | F25D 23/02 49/501 |
| 2011/0115355 | A1 * | 5/2011 | Heckler | F25D 23/02 312/405 |
| 2014/0132146 | A1 * | 5/2014 | Kim | F25D 23/02 312/405.1 |
| 2016/0061514 | A1 | 3/2016 | Seo | |
| 2017/0010040 | A1 | 1/2017 | Kim | |
| 2017/0059875 | A1 * | 3/2017 | Seung | G06F 3/044 |
| 2017/0191744 | A1 * | 7/2017 | Koo | F25D 27/005 |
| 2017/0211874 | A1 * | 7/2017 | Kim | A47L 15/4257 |
| 2017/0234603 | A1 * | 8/2017 | Basso | F25D 23/025 454/183 |
| 2017/0321959 | A1 * | 11/2017 | Kim | F25D 23/025 |
| 2018/0031303 | A1 * | 2/2018 | Kim | F25D 23/02 |
| 2018/0112906 | A1 * | 4/2018 | Yi | F25D 23/02 |
| 2018/0112909 | A1 | 4/2018 | Choi | |
| 2018/0274846 | A1 | 9/2018 | Kim | |

FOREIGN PATENT DOCUMENTS

| | | |
|---|---|---|
| CN | 202164974 | 3/2012 |
| CN | 102472555 | 5/2012 |
| CN | 203857735 | 10/2014 |
| CN | 204240687 | 4/2015 |
| EP | 2 806 239 A2 | 11/2014 |
| JP | H 0452487 | 2/1992 |
| JP | H 0473580 | 3/1992 |
| JP | H 08-061837 | 3/1996 |
| JP | 02892781 | 5/1999 |
| JP | 2006-064287 | 3/2006 |
| JP | 2011-163639 | 8/2011 |
| KR | 10-2011-0089534 | 8/2011 |
| KR | 10-2013-0009090 | 1/2013 |

OTHER PUBLICATIONS

Extended European Search Report in Application 16794914.8 dated Aug. 17, 218.

Korean Notice of Allowance in Application 1020150100427 dated Jul. 12, 2018.

U.S. Office Action issued in grandparent U.S. Appl. No. 15/310,173 dated Jun. 8, 2018.

European Notice of Allowance dated Aug. 11, 2020 issued in Application 16 794 914.8.

* cited by examiner

DOOR FOR HOME APPLIANCE, HOME APPLIANCE, AND METHOD FOR MANUFACTURING THE SAME

CROSS-REFERENCE TO RELATED APPLICATIONS

This application is a Continuation Application and claims priority to U.S. application Ser. No. 16/252,389, filed Jan. 18, 2019, which is a Continuation Application and claims priority to U.S. patent application Ser. No. 15/310,173, filed Nov. 10, 2016 (now U.S. Pat. No. 10,228,182), which is a U.S. National Stage Application from PCT/KR2016/007764, filed Jul. 15, 2016, which claims priority from Korean Application No. 10-2015-0100427 filed Jul. 15, 2015, the entire contents of which are hereby incorporated by reference.

BACKGROUND

1. Field

Embodiments may relate to a door for a home appliance, a home appliance, and/or a method for manufacturing the same.

2. Background

A refrigerator is an apparatus for freeze or refrigerate foods by maintaining a temperature of a storage area provided therein at a predetermined temperature by using a freezing cycle configured of a compressor, a condenser, an expansion valve and an evaporator. Therefore, the refrigerator includes a storage area, for example, a freezer compartment and a refrigerator compartment, and its type is classified in accordance with positions of the freezer compartment and the refrigerator compartment. For example, the refrigerator may be classified into a top mount type having a freezer compartment mounted on a top of a refrigerator compartment, a bottom freezer type having a freezer compartment mounted below a refrigerator compartment, and a side by side type having freezer and refrigerator compartments arranged side by side.

The freezer compartment and the refrigerator compartment are provided inside a cabinet forming external appearance, and each of them may selectively be opened and closed by a freezer door and a refrigerator door. Some refrigerators include a user input panel provided on a door front surface. The panel may be provided to allow a user to apply a touch input thereto. This may be referred to as an interactive touch input panel. The user may select or change various functions of the refrigerator through the interactive touch input panel. Some refrigerators, particularly, a show case refrigerator used in a conveniences store may allow a user to see the inside of the refrigerator even without opening a door because the door is comprised of glass. However, since a refrigerator for home use includes an opaque freezer door and an opaque refrigerator door, it is general that the user may see the inside of the refrigerator by opening the freezer door and the refrigerator door.

In some refrigerator for home use, a user may see the inside of the refrigerator even without opening a door of the refrigerator. Therefore, cool air loss caused by frequently opening or closing the door may be avoided.

In this refrigerator, the door may include a panel assembly through which a user may see the inside of the refrigerator, and a frame assembly for supporting the panel assembly.

Meanwhile, the freezer compartment and the refrigerator compartment are provided inside a cabinet constituting external appearance of the refrigerator, and selectively opened or closed by a freezing door and a refrigerator door (hereinafter, referred to as "door for refrigerator" or "door" as a generic term. Since the refrigerator compartment or the freezer compartment are selectively sealed by the door for the refrigerator, the door should have predetermined insulation performance. To this end, a predetermined space is formed by a frame structure body constituting external appearance of the door to have a predetermined rigidity, the space is generally foamed and filled with a thermal insulator such as polyurethane to make a door. Since the frame structure body is a thin plate member, a foaming space determined by the frame structure body becomes a size of the door, that is, "upper and lower width of the door×left add right width of the door×depth of the door (front and rear direction of the door)", and this space becomes a foaming space and a foaming path, which should be filled with a thermal insulator.

In this door, since a size of the door becomes a foaming space, and the foaming space becomes a foaming path, the foaming path is relatively great. Therefore, a foaming injection hole is arranged at a center, approximately, of a rear surface (exactly, frame structure body) of the door. The temporary assembly door is arranged horizontally to allow the front surface of the temporarily assembled door toward the ground surface during foaming of the thermal insulator, and then the foaming agent which is the thermal insulator is injected through the foaming injection hole provided at the center of the rear surface of the temporary assembly door.

Meanwhile, since the aforementioned door for a refrigerator is opaque, a user may see the inside of the refrigerator by opening the freezer door and the refrigerator door. Recently, a refrigerator for allowing a user to see the inside thereof even without opening a door thereof has been suggested to reduce door opening or closing of thereof and thus avoid cool air loss caused by frequently opening or closing of the door.

In this refrigerator, the door may include a panel assembly comprised of glass through which the user may see the inside of the refrigerator, and a frame assembly for supporting the panel assembly. Of course the door may include a panel assembly having a touch input assembly and a frame assembly for supporting the panel assembly.

However, in the door for the refrigerator, the foaming space and the foaming path becomes a space defined by a portion except the panel assembly from the entire door, that is, an outer edge of the frame assembly and the panel assembly. Therefore, the door has a relatively smaller foaming space and foaming path than those of a general door, a problem may occur during foaming of the thermal insulator. That is, since foaming resistance is great during foaming of the thermal insulator, a problem may occur in that the foaming space may not be fully filled with the thermal insulator. Also, the foaming agent type thermal insulator may be swollen to leak into the foaming injection hole or the panel assembly or the foaming agent may flow backward to the foaming injection hole. Therefore, a solution for solving this problem is required.

This problem of the door may occur equally or similarly to a door of a home appliance, which requires insulation, as well as a door of a refrigerator.

DISCLOSURE

Technical Problem

Embodiments of the present invention is directed to a door for a refrigerator, a refrigerator and a method for manufacturing the same, which substantially obviate one or more problems due to limitations and disadvantages of the related art. An object of the present invention is to provide a door for a refrigerator, a refrigerator and a method for manufacturing the same, in which foaming performance of a thermal insulator can be improved during manufacture of the door.

Technical Solution

According to one embodiment of the present invention, a door for a home appliance comprises a panel assembly; and a frame assembly defining a predetermined space having an opening connected with an edge of the panel assembly, and making a foaming space for receiving a thermal insulator by means of the predetermined space of the frame assembly and the edge of the panel assembly, wherein a foaming injection hole through which the thermal insulator is injected is provided on at least one of ends of an upper surface, a lower surface, a left side and a right side of the frame assembly. The frame assembly includes a rear frame located on a rear surface of the door, and a side frame forming the predetermined space connected with the rear frame. The panel assembly includes two or more thermal insulation glass panels and a spacer provided between edges of the two thermal insulation glass panels, and a heating element is provided near the spacer.

Preferably, the frame assembly has a depth substantially the same as that of the panel assembly. The frame assembly may have a width of 35 mm or less. Meanwhile, the foaming injection hole is preferably provided at both ends of the frame assembly.

Meanwhile, the foaming injection hole is preferably provided on at least one of the ends of the upper surface and the lower surface of the frame assembly. More preferably, the foaming injection hole is provided at the end of the lower surface of the frame assembly. More preferably, the foaming injection hole is provided at both ends of the lower surface of the frame assembly. Meanwhile, the foaming injection hole is preferably provided in a long length direction of the frame assembly.

According to another aspect of the present invention, a door for a refrigerator comprises: a cabinet constituting appearance of the refrigerator; a main door rotatably coupled to the cabinet; and a sub door rotatably coupled to the main door, wherein the sub door includes a panel assembly; and a frame assembly defining a predetermined space having an opening connected with an edge of the panel assembly, and making a foaming space for receiving a thermal insulator by means of the predetermined space of the frame assembly and the edge of the panel assembly, wherein a foaming injection hole through which the thermal insulator is injected is provided on at least one of ends of an upper surface, a lower surface, a left side and a right side of the frame assembly.

According to still another aspect of the present invention, a door for a refrigerator comprises a support portion surrounding an opened center portion, having a thermal insulation space therein, and a thermal insulator received in the thermal insulation space, wherein a foaming injection hole through which the thermal insulator is injected is provided on at least one of ends of an upper surface, a lower surface, a left side and a right side of the support portion.

According to further still another aspect of the present invention, a method for manufacturing a door for a refrigerator comprises a temporary assembly step of temporarily assembling a support portion surrounding an opened center portion, having a thermal insulation space therein; and a foaming step of injecting the thermal insulator in a length direction of the support portion.

At the foaming step, it is preferable that the thermal insulator is injected in a long length direction of the support portion. At the foaming step, it is more preferable that the thermal insulator is foamed after the support portion is arranged vertically. The foaming injection hole through which the thermal insulator is injected may be provided on at least one of the upper surface, the lower surface, the left side and the right side of the frame assembly. Meanwhile, at the temporary assembly step, the panel assembly may temporarily be assembled in the center portion.

According to further still another aspect of the present invention, a door for a refrigerator comprises a support portion surrounding an opened center portion, having a thermal insulator received in the support portion, wherein a foaming injection hole through which the thermal insulator is injected is provided to foam the thermal insulator in a long length direction of the support portion.

The foaming injection hole is preferably provided on at least one of the upper surface, the lower surface, the left side and the right side of the support portion. More preferably, the support portion is respectively provided at both ends. Meanwhile, the panel assembly may be provided at the center portion.

To achieve the aforementioned object, according to one embodiment of the present invention, a door for a home appliance comprises a panel assembly; and a frame assembly having an opening connected with an edge of the panel assembly to support the panel assembly, and making a foaming space for receiving a thermal insulator between edges of the frame assembly and the panel assembly, wherein a foaming injection hole through which the thermal insulator is injected is provided on at least one of ends of an upper surface, a lower surface, a left side and a right side of the frame assembly.

The frame assembly may include a rear frame located on a rear surface of the door, and a side frame connected with the rear frame, making the foaming space.

The panel assembly may include two or more glass panels and a spacer provided between edges of the two glass panels, and a heating element may be provided near the spacer.

The frame assembly may have a depth substantially the same as that of the panel assembly.

The frame assembly may have a width of 35 mm or less.

The foaming injection hole may be provided at both ends of the frame assembly.

The foaming injection hole is preferably provided on at least one of the ends of the upper surface and the lower surface of the frame assembly. In this case, it is preferable that a width of the upper surface and the lower surface of the frame assembly is smaller than that of the left and right sides of the frame assembly. That is, in a state that the door is arranged vertically, the door may be formed in a rectangular shape having a height greater than a left and right width.

Preferably, the foaming injection hole is provided at an end of the lower surface of the frame assembly.

The foaming injection hole is preferably provided at both ends of the lower surface of the frame assembly.

Preferably, the foaming injection hole is provided in a long length direction of the frame assembly. In case of a rectangular shape door having an upper and lower height greater than a left and right width, it is preferable that a foaming direction through the foaming injection hole is a vertical direction.

To achieve the aforementioned object, according to one embodiment of the present invention, a refrigerator comprises a cabinet constituting appearance of the refrigerator; a main door rotatably coupled to the cabinet; and a sub door rotatably coupled to the main door, wherein the sub door includes a panel assembly; and a frame assembly having an opening connected with an edge of the panel assembly to support the panel assembly, and making a foaming space for receiving a thermal insulator between edges of the frame assembly and the panel assembly, wherein a foaming injection hole through which the thermal insulator is injected is provided on at least one of ends of an upper surface, a lower surface, a left side and a right side of the frame assembly.

To achieve the aforementioned object, according to one embodiment of the present invention, a door for a home appliance comprises a frame assembly surrounding an edge of the panel assembly to support the panel assembly, forming a foaming space with the panel assembly, and a foaming injection hole provided on at least one of ends of an upper surface, a lower surface, a left side and a right side of the frame assembly to inject a thermal insulator in a length direction of the frame assembly.

After the panel assembly and the frame assembly are temporarily assembled, it is preferable that the panel assembly is fixed to the frame assembly by a foaming press by foaming of the thermal insulator.

Preferably, the foaming injection hole is provided to inject a foaming agent in a longer length direction of a horizontal length or a vertical length of the frame assembly.

The foaming injection hole is preferably formed such that a foaming direction of the foaming agent is substantially the same as a gravity direction.

To achieve the aforementioned object, according to one embodiment of the present invention, a door for a home appliance comprises a panel assembly including a front panel and a rear panel; a frame assembly including a rear frame connected with the rear panel, and a side frame connecting the rear frame with the front panel; a thermal insulation space formed between the frame assembly and the panel assembly, receiving a thermal insulator therein; and a foaming injection hole provided to foam the thermal insulator to at least one of ends of an upper surface, a lower surface, a left side and a right side of the frame assembly in a length direction of the frame assembly, wherein the rear frame is partially inserted into the side frame and coupled to the side frame to increase a coupling force between the rear frame and the side frame by means of an expansion pressure of the thermal insulator expanded in the foaming direction and a vertical direction.

The side frame includes a heat bridge extended to an inner side of a radius direction along a rear surface of the front panel, the heat bridge being formed in parallel with the rear surface of the front panel.

Preferably, a hot wire is provided between the heat bridge and the rear surface of the front panel and is tightly adhered to the front panel.

The hot wire is provided to be tightly adhered to the front panel through a metal sheet to block inflow of the thermal insulator to the hot wire, and its position is fixed by the pressure of the thermal insulator applied to the metal sheet.

A center portion of the panel assembly corresponding to the inner side of the radius direction of the frame assembly may be a see-through area of the door or a touch area to which a touch input of a user is applied.

To achieve the aforementioned object, according to one embodiment of the present invention, a door for a home appliance and a home appliance including the same, the door comprising: a panel assembly of a rectangular shape having a height greater than a left and right width; a frame assembly surrounding an edge of the panel assembly to support the panel assembly, forming a foaming space with the panel assembly, and including an upper frame, a lower frame, and both side frames; and a foaming injection hole provided at each of left and right ends of the lower frame to inject a thermal insulator to the foaming space.

One side of the frame assembly is opened, and the opened portion is blocked by the panel assembly. Therefore, the frame assembly surrounds the panel assembly along the edge of the panel assembly. Also, a foaming space filled with the foaming agent may be formed between the frame assembly and the panel assembly.

That is, the frame assembly and the panel assembly may be coupled to each other by the foaming agent which is filled, instead of direct coupling between the frame assembly and the panel assembly. In other words, coupling between the frame assembly and the panel assembly may be completed by foaming after temporary assembly between the frame assembly and the panel assembly.

The foaming injection hole may include a first injection hole provided at a direct lower portion of the side frame, and a second injection hole provided to be inclined toward an inner side of the door from the direct lower portion of the side frame. Preferably, the first injection hole and the second injection hole are formed on the upper frame or the lower frame, which forms the upper surface or the lower surface of the frame assembly.

Therefore, since injection may be performed in one direction, an injection device may easily be manufactured and also injection may easily be performed.

The first injection hole is provided to perform foaming in the same manner as a length direction of the first side frame of both side frames, the first side frame having a greater sectional area of the foaming space, and the second injection hole is provided to be inclined toward the inner side of the door in a length direction of the second side frame having a smaller sectional area of the foaming space to allow a foaming agent injected through the second injection hole to move to the foaming space formed by the lower frame and then move to the foaming space formed by the second side frame.

If the foaming agent is injected after the door is arranged reversely (the foaming injection hole is arranged at an upper portion), the foaming agent injected through the first injection hole may initially move to the lower portion vertically and then move horizontally. The foaming agent injected through the second injection hole may initially move horizontally and then move to the lower portion vertically.

The frame assembly supports the panel assembly at the rear of the panel assembly, includes a rear frame for forming the foaming space between the panel assembly and the upper frame, the lower frame and both side frames.

The rear frame is preferably provided with vent holes formed to discharge out the air inside the foaming space during foaming. In this case, the rear frame is located vertically with respect to a moving direction of the foaming agent. That is, at the rear frame located at the rear of the panel assembly, the vent holes are preferably formed discharge the air out to the rear of the door. Therefore, the air not the foaming agent may be discharged out more actively.

The rear frame may be provided with a gasket mounting groove on which a gasket is mounted, and the gasket mounting groove maybe provided with vent holes formed to discharge out the air inside the foaming space during foaming.

The gasket is mounted on the gasket mounting groove, and thus the gasket mounting groove is covered by the gasket. Therefore, the vent holes formed in the gasket mounting groove are covered by the gasket. Therefore, since the vent holes are not exposed to the outside, esthetic appearance of the door is not damaged.

Also, the foaming injection hole may be covered after foaming. For example, a cover coupled with the lower frame may be provided. That is, if foaming is completed, the cover is coupled with the lower frame, whereby the foaming injection hole may be covered.

Advantageous Effects

Advantageous effects of the door for the refrigerator, the refrigerator and the method for manufacturing the same as described above may be as follows.

First of all, according to the present invention, since foaming resistance may be reduced when a temporarily assembled door is foamed with a thermal insulator, the thermal insulator may be prevented from being less filled in the frame assembly.

Secondly, according to the present invention, since foaming resistance may be reduced when a temporarily assembled door is foamed with a thermal insulator, the thermal insulator which is a foaming agent may be prevented from being leaked to the foaming injection hole or the panel assembly while being swollen. Also, the thermal insulator which is the foaming agent may be prevented from flowing backward to the foaming injection hole.

Thirdly, according to the present invention, since the temporarily assembled door is arranged vertically to foam the thermal insulator, the thermal insulator, which is the foaming agent, more effectively moves to a foaming path by means of gravity, whereby foaming performance may be improved.

BRIEF DESCRIPTION OF THE DRAWINGS

Arrangements and embodiments will be described in detail with reference to the following drawings in which like reference numerals refer to like elements and wherein.

DETAILED DESCRIPTION

Hereinafter, the preferred embodiment of the present invention will be described with reference to the accompanying drawings. Hereinafter, for convenience of description, a bottom freezer type refrigerator will be described. Of course, the present invention is not limited to the bottom freezer type refrigerator, and may be applied to a top mount type refrigerator, a side by side type refrigerator, etc. Also, for convenience of description, a refrigerator provided with a refrigerator door having a main door and a sub door 2 will be described exemplarily. Of course, the present invention is not limited to the refrigerator, and may be applied to a refrigerator having one refrigerator door. That is, the present invention may be applied to all refrigerators each having a door provided with a panel assembly.

Figure 1:
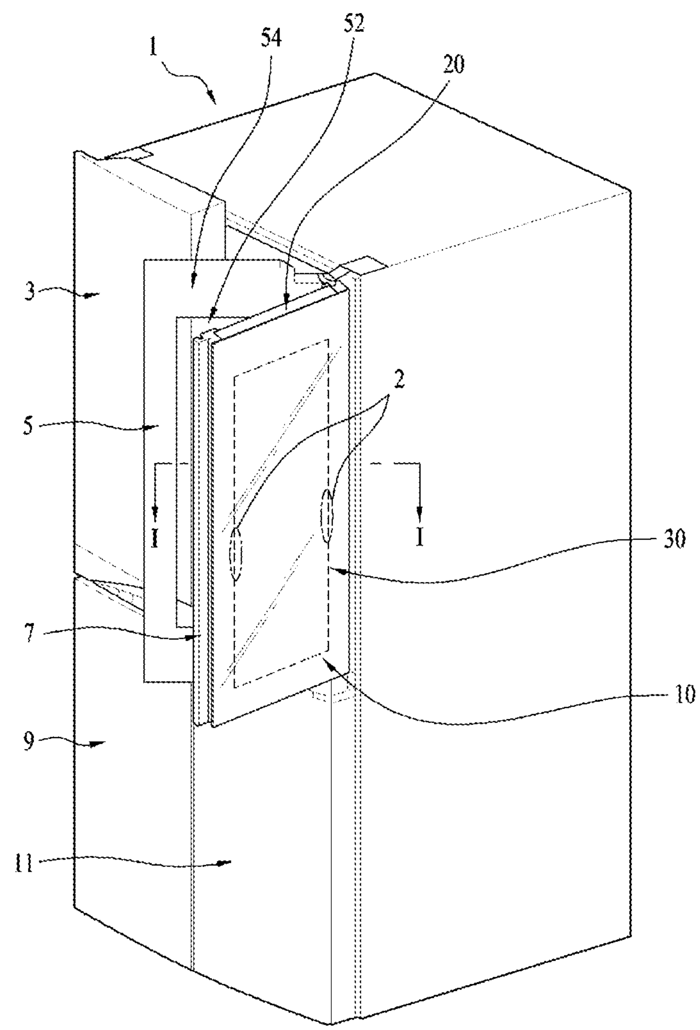
FIG. 1 is a perspective view illustrating an example of a refrigerator according to the embodiment of the present invention.

First of all, a whole configuration of a preferred embodiment of a refrigerator according to the present invention will be described with reference to FIG. 1. In this embodiment, the number of doors, installation type, etc. are not main subjects of this embodiment, and thus will briefly be described within the range that assists understanding of the present invention.

A refrigerator compartment is provided at an upper portion of a cabinet 1, and a freezer compartment is provided at a lower portion of the cabinet 1. Doors 3, 5, 9 and 11 are rotatably installed at upper and lower portions of the cabinet 1 to open or close the refrigerator compartment and the freezer compartment. The doors may be hingedly coupled to the cabinet. Although two doors 3, 5, 9 and 11 for respectively opening or closing the refrigerator compartment and the freezer compartment are shown in this embodiment, one door may be used without limitation to this embodiment. Also, although a main door 5 and a sub door 7 are shown as right doors for the refrigerator compartment in this embodiment, one door may be used as a right door for the refrigerator compartment without limitation to this embodiment.

According to this embodiment, the right door for the refrigerator compartment includes a main door 5 rotatably coupled to the cabinet 1, and a sub door 7 rotatably coupled to the main door 5. Since the main door 5 is provided with another side storage space such as a basket, a user may approach storage goods kept in the side storage space by opening the sub door 7 only without opening the main door 5.

The sub door 7 according to this embodiment includes a panel assembly 10 through which a user may see from the outside of the refrigerator, and a frame assembly 20 for supporting the panel assembly 10. The sub door may also include an insulation space that is provided based on the panel assembly and the frame assembly. Preferably, the panel assembly 10 has predetermined insulation performance by using insulation glass, etc., and the frame assembly 20 has predetermined insulation performance. To avoid dew formation at a connection portion 2 between the panel assembly 10 and the frame assembly 20, it is preferable that a heating element 30 is provided at the connection portion between the panel assembly 10 and the frame assembly 20 (detailed structure of panel assembly, frame assembly and heating element will be described later).

Figure 2:
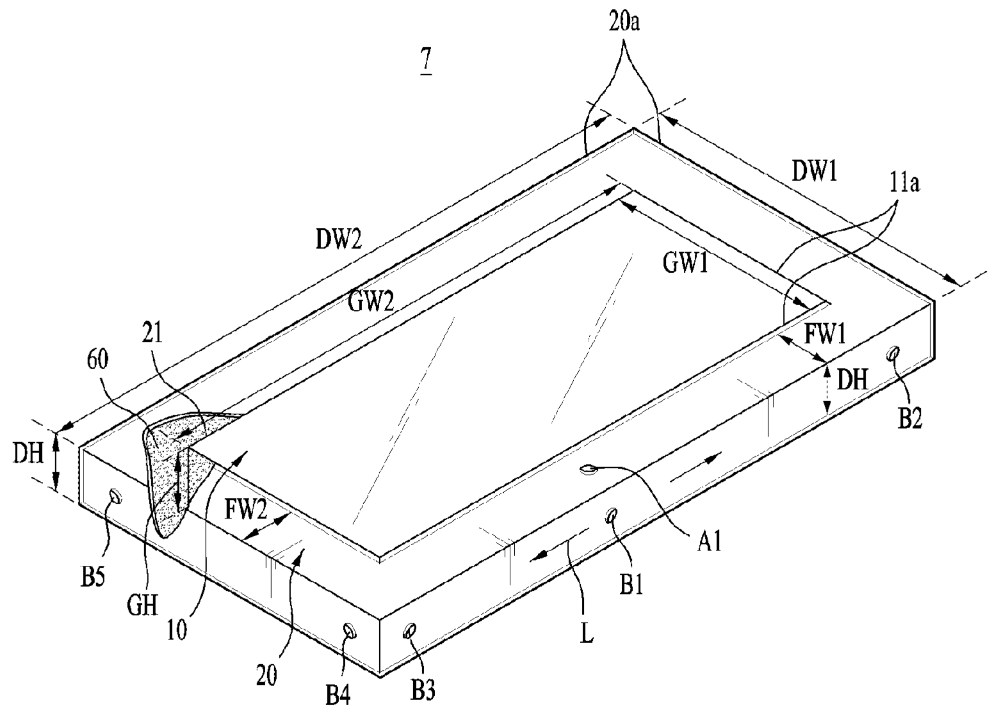
FIG. 2 is a perspective view illustrating a door of FIG. 1 to describe the principle of the embodiment of the present invention.

Referring to FIG. 2, the principle of the embodiment of the door for the refrigerator according to the present invention will be described. The sub door 7 described in this embodiment is only one example of the door having the panel assembly 10. Therefore, the sub door 7 will be referred to as "door" for convenience of description except that the sub door 7 should be provided as a special door. FIG. 2 briefly illustrates the door 7 having the panel assembly 10 to describe the principle of the present invention. Also, the rear surface of the door 7 is shown as an upper portion.

As described above, the door 7 includes a panel assembly 10, a frame assembly 20 for supporting the panel assembly 10, and a thermal insulator 60 (or insulation space) defined by the frame assembly and foamed in a foaming space. Preferably, the panel assembly 10 is, but not limited to, approximately rectangular shape to correspond to the shape of the door. Preferably, the frame assembly 20 supports an edge 11*a* of the panel assembly 10. For example, the frame assembly 20 defines a foaming space having an opening 21, and the panel assembly 10 is preferably connected to the opening 21 (see FIG. 3).

Meanwhile, in case of a door having no panel assembly 10, a foaming space becomes a size of the door, that is, "left and right width DW2 of the door×upper and lower width DW2 of the door×depth DH of the door". Also, the foaming space briefly becomes a foaming path. However, in case of the door 7 having the panel assembly, a space substantially made by the frame assembly 10 becomes a foaming space. The foaming space becomes a space excluding the size of the panel assembly 10 from the size of the door 7. The size of the panel assembly 10 becomes "left and right width GW1 of the panel assembly x upper and lower width GW2 of the panel assembly×depth GH of the panel assembly". Also, since the frame assembly 10 is connected to the edge 11*a* of the panel assembly 10, a space made between the edge 11*a* of the panel assembly 10 and an edge 20*a* of the frame assembly 20 becomes a foaming space. Therefore, a left and right width FW1 of the frame assembly 20 becomes a difference between the left and right width DW1 of the door 7 and a left and right width GW1 of the panel assembly 10, and an upper and lower width FW2 of the frame assembly 20 becomes a difference between the upper and lower width DW2 of the door 7 and an upper and lower width GW2 of the panel assembly 10. Although the depth of the frame assembly 20 may be different from the depth DH of the door 7, it is preferable that the depth of the frame assembly 20 is approximately the same as the depth DH of the door 7. Also, it is preferable that the depth of the frame assembly 20 is the same as or greater than the depth GH of the panel assembly 10.

Generally, the size of the door 7 is previously determined in accordance with the refrigerator, and it is preferable that the size of the panel assembly 10 is great if possible. This is because that the user may easily see the inside of the refrigerator through the panel assembly 10 if the size of the panel assembly 10 is great. Therefore, if requirements of the door such as rigidity and insulation are within a satisfactory range, the size of the panel assembly 10, particularly the left and right width GW1 and the upper and lower width GW2 are close to the left and right width FW1 and the upper and lower width DW2 of the door, whereby it is preferable that the left and right width FW1 and the upper and lower width DW2 of the frame assembly 20 are small. Therefore, it is preferable that the difference between the upper and lower width DW2 of the door 7 and the upper and low width GW2 of the panel assembly 10 and the difference between the left and right width DW1 of the door 7 and the left and right width GW1 of the panel assembly 10 are relatively small.

That is, it is preferable that an interval between the edge 11*a* of the panel assembly 10 and the edge 20*a* of the frame assembly 20, that is, the widths FW1 and FW2 of the frame assembly 20 are relatively narrow. If the size of the panel assembly 10 is maximized while another design condition of the door 7 is being satisfied, it is preferable that the widths FW1 and FW2 of the frame assembly 20 are minimized and the depth DH of the frame assembly 20 is minimized. This means that the foaming path becomes smaller than the width of the foaming path allowable in the thermal insulator foaming method of the related art. To this end, the depth DH and the widths FW1 and FW2 of the frame assembly 20 may be about 35 mm or less, for example.

Meanwhile, the foaming space where the thermal insulator 60 is foamed becomes a space mainly made by the frame assembly 20. However, as described above, it is preferable that the widths FW1 and FW2 of the frame assembly 20 are relatively narrow in view of the properties of the frame assembly 20. Therefore, in case of the panel assembly door 7, the foaming space and the foaming path are relatively smaller than those of the door having no panel assembly. Therefore, in accordance with the related art, if the foaming injection hole (for example, A1) is provided on a rear surface of the frame assembly 20 and the thermal insulator 60 is injected through the foaming injection hole A1, a problem may occur in foaming performance. This is because that the foaming interval of the door 7 according to the present invention is narrower than the foaming interval allowable in the foaming method of the related art and thus foaming resistance may be increased to cause a problem in foaming performance.

That is, since the depth DH and the width FW1 of the frame assembly 20 are small, foaming resistance is great and thus a filling time is increased and the foaming agent may not be filled fully. Also, the foaming agent may be leaked to the foaming injection hole A1 or the panel assembly 10. Therefore, in this embodiment, it is preferable that foaming injection holes B1, B2, B3, B4 and B5 are arranged at predetermined positions corresponding to at least one of a left side, a right side, an upper surface and a lower surface not front and rear surfaces of the frame assembly 20.

The foaming injection holes B1, B2, B3, B4 and B5 of the door 7 for the refrigerator according to the present invention will now be described in detail.

As described above, it is preferable that the foaming injection holes B1, B3, B3, B4 and B5 are provided on at least one of the left side, the right side, the upper surface and the lower surface (hereinafter, comprehensively referred to as "side" except that the respective sides of the frame assembly 20 should be categorized specially from one another) of the frame assembly 20. (the foaming injection holes at the left side and the lower surface are shown in FIG. 2). Also, it is more preferable that the foaming injection holes B2, B3, B4 and B5 are provided on ends of the upper surface, the lower surface, the left side and the right side of the frame assembly 20. This is because that if the foaming injection hole B1 is located at the center of the side of the frame assembly 20, the distance FW1 between the panel assembly 10 and the foaming injection hole B1 is short, and thus foaming is slowly performed in a length direction L (orthogonal direction of the foaming direction). Also, in this case, the foaming agent may be leaked along the direction of the panel assembly 10. Therefore, it is preferable that the foaming injection holes B2, B3, B4 and B5 are located toward the end of the frame assembly 20 instead of the center of the frame assembly 20.

Meanwhile, as described above, the foaming injection holes B2, B3, B4 and B5 may be located at the side of the frame assembly 20, that is, ends of the left side, the right side, the upper surface and the lower surface. However, in case of the foaming injection holes B2 and B3 (the foaming injection hole of the left side is only shown in FIG. 2) located at the right side and the left side of the frame assembly 20, although the thermal insulator may be foamed without relative foaming resistance, the foaming injection holes B2 and B3 are exposed after foaming, whereby it is not good in view of esthetic appearance. This is because that the right side and the left side of the frame assembly 20 constitute external appearance of the door 7, and the foaming injection holes B2 and B3 may be seen to a user when the door 7 is opened or closed. Also, a hinge structure (not shown) for connecting the door 7 to the cabinet of the refrigerator to open or close the door 7 is coupled to upper and lower ends of the right side or the left side of the frame assembly 20. Therefore, if the foaming injection holes B2 and B3 are located at the ends of the right side and the left side of the frame assembly 20, the hinge structure may be foaming resistance during foaming of the thermal insulator. Therefore, it is more preferable that the foaming injection holes B4 and B5 (the foaming injection hole of the lower surface is only shown in FIG. 2) are provided at the ends of the upper surface and the lower surface instead of the ends of the left side and the right side of the frame assembly 20.

Meanwhile, as described above, if the foaming injection holes B4 and B5 are provided at the ends of the upper surface and the lower surface of the frame assembly 20, there is no problem in foaming task of the thermal insulator. However, parts such as a sensor, a PCB, and a magnet are installed at the end of the upper surface of the frame assembly 20. Therefore, if the foaming injection hole (not shown) is located at the end of the upper surface of the frame assembly 20, the position of the foaming injection hole should be selected to avoid the above parts, and the above parts may be foaming resistance. Also, the foaming injection hole located at the end of the upper surface of the frame assembly 20 may be exposed to the outside during opening of the door. Particularly, in case of the door installed at the lower portion of the refrigerator, if the door is opened, the foaming injection hole is seen to a user, whereby it is not good in view of esthetic appearance. Therefore, it is more preferable that the foaming injection holes B4 and B5 are located at the end of the lower surface of the frame assembly 20.

Meanwhile, one foaming injection hole B4 or B5 may be provided at one end of the lower surface of the frame assembly 20, or two foaming injection holes B4 and B5 may respectively be provided at both ends. If one foaming injection hole is provided, it is preferable that a position favorable for obtaining foaming quality is selected. For example, in the same manner as the embodiment shown in FIG. 3, if an indentation 330 that serves as a handle is provided at one side of the frame assembly 20, it is preferable that the foaming injection hole B4 is selected at the end of an opposite portion. This is because that the foaming injection hole B5 may be partially overlapped with the edge of the frame assembly 20 if the foaming injection hole B5 at the portion where the indentation 330 serving as a handle is provided is selected. Therefore, since a part of the foaming agent is in contact with the edge portion of the frame assembly 20, the foaming agent may flow backward. On the other hand, if the foaming injection hole B4 at the portion where the indentation 330 is not formed is selected, since the foaming injection hole B4 is not partially overlapped with the frame assembly 20, the foaming agent may be prevented from flowing backward (see FIG. 5). Of course, if there is no problem as the indentation 330 is not provided in accordance with the structure of the door, the foaming injection hole may be selected regardless of the left and right sides.

Meanwhile, as described above, the foaming agents B4 and B5 may respectively be provided at both ends of the frame assembly 20. Even in this case, in the same manner as the embodiment shown in FIG. 3, if the indentation 330 serving as a handle at one side of the frame assembly 20 is provided, the foaming agent flown to the foaming injection hole B5 at the portion where the indentation 330 is provided may flow backward. To avoid this, it is preferable that the width of the lower surface of the frame assembly 20 where the foaming injection holes B4 and B5 are provided is greater than the widths of the left side portion, the right side portion and the upper surface portion. If the width of the left side portion, the right side portion and the upper surface portion of the frame assembly 20 is smaller than 35 mm, it is preferable that the width of the lower surface portion is greater than 35 mm. For example, if the width of the left side portion, the right side portion and the upper surface portion of the frame assembly 20 is 25 mm, it is preferable that the width of the lower surface portion is 45 mm. In this case, since the foaming agent flown to the foaming injection hole B5 is relatively great and may be guided to the portion where foaming resistance is small, leakage of the foaming agent may be avoided.

Figure 3:
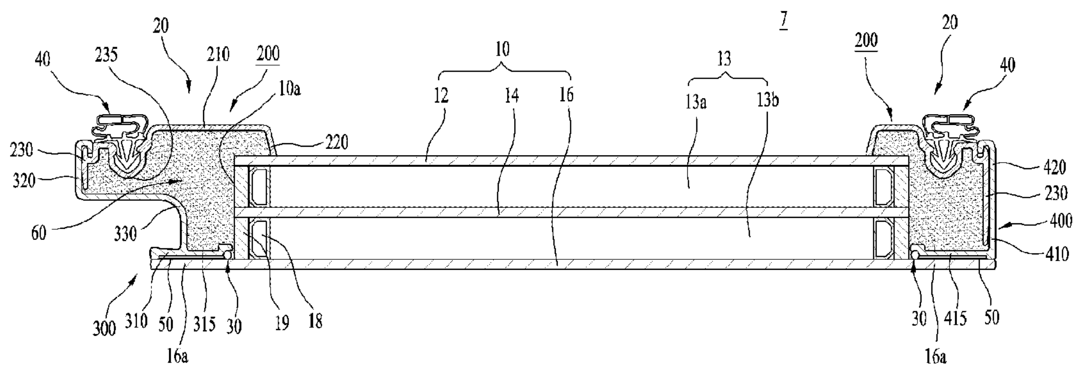
FIG. 3 is a sectional view taken along line I-I of FIG. 1.
Figure 4:
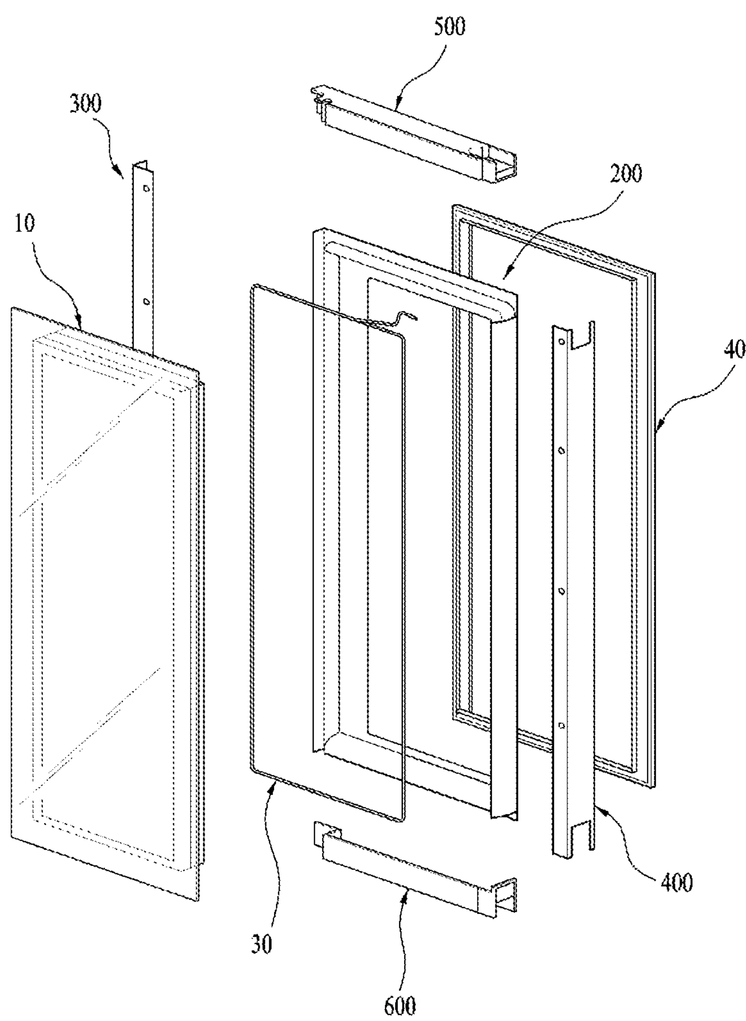
FIG. 4 is a preferred exploded perspective view illustrating a door of FIG. 1.

Referring to FIGS. 3 and 4, the preferred embodiment of the door according to this embodiment will be described in detail. The sub door 7 described in this embodiment is an example of the door having the panel assembly. Therefore, the sub door 7 is referred to as a door for convenience of description except that the sub door 7 is categorized as a special door in the following description.

It is preferable that the panel assembly 10 of the door 7 has predetermined insulation performance. Preferably, the panel assembly 10 is, but not limited to, approximately rectangular shape to correspond to the shape of the door. Preferably, the frame assembly 20 supports the edge of the panel assembly 10, and has predetermined insulation performance. It is preferable that the heating element 30 is provided at a portion, that is, connected portion 10*a*, where the panel assembly 10 and the frame assembly 20 are mutually connected to each other. That is, the heating element 30 may be provided at a predetermined position of the connected portion 10*a* between the panel assembly 10 and the frame assembly 20. Also, if the connected portion 10*a* between the panel assembly 10 and the frame assembly 20 may substantially be heated, the heating element 30 may be installed at a predetermined distance from the connected portion 10*a*.

Each element of the door will be described in detail.

First of all, an example of the panel assembly 10 will be described.

As illustrated in FIG. 3, the panel assembly 10 may include a front panel 16. The front panel 16 defines the front surface of the door 7. The front panel 16 is made of a transparent material to allow a user to see through the front panel 16. The front panel 16 is made of a touch panel to allow a user to control an operation of a home appliance through the touch panel. The front panel 16 may be a glass panel. That is, the front panel 16 may be a glass panel even if the front panel 16 is a transparent panel or a touch panel.

The inner space of the panel assembly, which is defined by the panel assembly 10, may be an insulating space provided at the rear of the front panel 16. For example, as shown in FIG. 3, the panel assembly 10 may include an intermediate panel 14 and a rear panel 12 to improve insulation performance. However, without limitation to the example shown in FIG. 3, a number of the panels may be varied and/or another type thermal insulating panel may be provided. Therefore, the panel assembly 10 may include the front panel 16 and a thermal insulating panel provided at the rear of the front panel. In case of the transparent panel assembly 10 shown in FIG. 3, the front panel 16, the intermediate panel 14 and the rear panel 12 may be glass panels, and a space among the panels is sealed by a proper gas. In case of the touch panel assembly 10, an inner space defined by the panel assembly 10 may include one or a plurality of sensors, for example, sensors for sensing a touch input applied to the front panel 16, such as a touch sensor and an electromagnetic sensor.

For example, the front panel 16 may be formed to be greater than the other portion of the panel assembly 10. In the example shown in FIG. 2, the front panel 16 is greater than the intermediate panel 14 and the rear panel 12. For example, the front panel 16 may substantially be the same as the size of the door 7, and may cover the frame assembly 20 when viewed at the front of the refrigerator. As described above, since the front panel 16 defines a front appearance of the door 7, the front panel 16 may have the same size as that of the door and provide very esthetic appearance. The front panel 16 may provide appearance of the door seen to a user like that the door is formed as a single panel. To this end, the front panel 16 has a peripheral portion or an extension portion (peripheral front panel portion) 16*a*. The extension portion may be a portion extended from an outer edge of the rear panel 12 or the intermediate panel to all directions.

First of all, the panel assembly 10 will be described as follows. It is preferable that the panel assembly 10 includes two or more panels 12, 14 and 16 to obtain predetermined insulation performance. The panel may be formed of a glass material. A spacer 18 for maintaining intervals among the panels 12, 14 and 16 is provided at the edges of the panels 12, 14 and 16, and it is preferable that the panels 12, 14 and 16 are coupled to one another by using a sealant 19. That is, the space among the panels may be sealed through the sealant 19.

Preferably, thermal insulation glass having predetermined insulation performance is used as the plurality of panels 12 and 14. Of course, two or more thermal insulation glasses may be used. Moreover, low-e glass is preferably used as the thermal insulation glasses 12 and 14 to shield heat loss caused by radiation. Although a hard low-e glass and a soft low-e glass may be used as the low-e glasses, it is preferable that the soft low-e glass is used to obtain more excellent low-e performance.

Since the front panel 16 located at the front of the plurality of panels 12, 14 and 16 is located at the front of the door 7 to form appearance of the door 7, a tempered glass is preferably used to avoid damage. Also, it is preferable that glass (hereinafter, referred to as “discolored glass”) through which a user may selectively see the inside of the refrigerator by controlling light transmittance is used as the front panel 16. That is, when a lamp inside the refrigerator is turned off, it is preferable that the front panel 16 becomes an opaque state to allow a user not to see the inside of the refrigerator externally. When the lamp inside the refrigerator is turned on, it is preferable that the front panel 16 becomes a transparent state to allow a user to see the inside of the refrigerator externally. Also, the front panel 16 having a coloring function is not limited to a special glass, and a color glass may be used as the front panel 16, or an opaque coated glass by TI deposition may be used as the front panel 16. Of course, it is preferable that the front panel 16 has insulation performance.

Meanwhile, it is preferable that the front panel 16 has a size greater than those of the other panels 12 and 14, that is, the intermediate panel 14 and the rear panel 12. For example, it is preferable that the front panel 16 has approximately the same size as that of the door. As described above, since the front panel 16 of the panel assembly 10 becomes appearance of the door 7, if the size of the front panel 16 is the same as that of the door 7, the whole door 7 is seen to a user as glass, whereby esthetic appearance is improved. To this end, the front panel 16 has an extension portion 16*a* which becomes a portion extended from the portion corresponding to the edges of the rear panel 12 and the intermediate panel 14 to a width direction of left and right sides of the door. In this case, since the whole door is seen to a user as a glass, esthetic appearance may be improved.

Although Al or a thermal protection spacer (TPS) may be used as the spacer 18, the TPS is preferably used as the spacer 18 to improve insulation performance at the portion where the spacer 18 is installed. It is preferable that a moisture absorbent is provided inside the spacer 18.

Meanwhile, a vacuum state may become between the rear panel 12 and the intermediate panel 14 and between the intermediate panel 14 and the front panel 16, or the air or Ar gas may be filled between the rear panel 12 and the intermediate panel 14 and between the intermediate panel 14 and the front panel 16. Since the Ar gas is an inert gas which has insulation performance more excellent than that of the air and can be prevented from being changed by a chemical action, it is preferable that the Ar gas is used instead of the air.

Next, the frame assembly 20 will be described in detail.

Preferably, the frame assembly 20 has predetermined insulation performance. To this end, the frame assembly 20 may include, but not limited to, a portion for supporting the door at a predetermined rigidity for supporting the panel assembly 10, and a portion substantially serving as a thermal insulation function. The frame assembly 20 defines a thermal insulation space for receiving a thermal insulator 60 having predetermined thermal insulation performance, and is preferably coupled to the panel assembly 10.

Preferably, the frame assembly 20 includes, but not limited to, a plurality of parts considering convenience of assembly of the door. First of all, the whole configuration of an example of the frame assembly 20 will be described with reference to FIG. 3.

The frame assembly 20 includes a rear frame 200 located at the rear of the door. Also, the frame assembly 20 includes side frames 300 and 400 located at left and right sides of the door, an upper frame 500 located on an upper end of the door, and a lower frame 600 located at a lower end of the door. For example, the panel assembly 10 is transparent, and the rear frame 200, the side frames 300 and 400, the upper frame 500 and the lower frame 600 define a thermal insulation space together with the panel assembly 10. That is, these frames define the thermal insulation space along upper and lower and left and right corners of the panel assembly 10 together with the panel assembly 10. In an example of a see-through transparent panel assembly 10, the thermal insulation space may receive the thermal insulator 60. An example of the thermal insulator may include a thermal insulation foam or another material thermal insulator or a thermal insulation gas. The panel assembly 10 may be connected to an opening defined by inner corners of the rear frame 200, the side frames 300 and 400, the upper frame 500 and the lower frame 600. For example, if the panel assembly 10 is transparent, side corner portions of the panel assembly 10 and the space defined by the frames may be filled with the thermal insulator (see FIG. 3). Alternatively, if the panel assembly is a touch panel, a space between the rear panel 12 and the intermediate panel 14 may be filled with the thermal insulator.

Preferably, the rear frame 200 is located at an inner side of the door, and serves to support the whole door. The frames 300, 400, 500 and 600 are located at upper and lower and left and right portions of the panel assembly 10, and may constitute a part of external appearance of the door. The frames 300, 400, 500 and 600 prevent distortion of the door from occurring, and preferably serve to prevent dew formation from occurring at the door together with the thermal insulator 60.

The frames 300, 400, 500 and 600 may constitute a part of external appearance of the door, and for example, may be regarded as a decorative trim that can be seen outside the door.

The rear frame 200, the side frames 300 and 400 and their mutual relationship will be described with reference to FIG. 3 again.

Mutual relationship among the panel assembly 10, the rear frame 200, the upper frame 500, and the lower frame 600 may have a similar structure. For convenience of description, a basis structure of the rear frame 200 and the side frames 300 and 400 will be described herein, and a more detailed structure thereof will be described in the following embodiment, that is, the embodiment of a modified structure of the frame assembly.

Preferably, the rear frame 200 includes a first end 220 connected with the panel assembly 10, a second end 230 connected to the side frames 300 and 400, and a connecting portion 210 connecting the first end 220 with the second end 230. The first end 220 of the rear frame 200 is a portion connected to the rear panel 12 of the panel assembly 10, and the second end 230 is a portion connected to the side frame. It is preferable that the connecting portion 210 connecting the first end 220 with the second end 230 is approximately parallel with the front surface of the cabinet of the refrigerator. It is preferable that a gasket 40 is installed at a predetermined portion 235 of the rear frame 200 and its inner side is approximately parallel with the portion 210 for connecting both ends of the rear frame 200. Meanwhile, it is preferable that the first end 220 of the rear frame 200 is connected to the rear panel 200 to support the rear panel 200. Also, it is more preferable that the first end 220 of the rear frame 200 is provided to surround the spacer 18 which is vulnerable to thermal insulation. In other words, it is preferable that the first end 220 is located at the inner side more inwardly than the spacer 18 in a radius direction.

The side frame 400 (for example, right frame) may include a rear frame connecting portion 420 connected with the rear frame 200, and a panel connecting portion 410 extended from the rear frame connecting portion 420 and adjacent to the outside of the panel assembly 10, preferably the extension portion 161. It is preferable that the panel connecting portion 410 of the side frame 400 is connected to an end of the extension portion 16*a* of the front panel 16.

The side frame 300 (for example, left frame) may include a rear frame connecting portion 320 connected with the rear frame 200, and a panel connecting portion 310 extended from the rear frame connecting portion 320 and adjacent to the outside of the panel assembly 10, preferably the extension portion 161. The left side frame 300 includes an indentation 330 indented toward the inner side of the door between the rear frame connecting portion 320 and the panel connecting portion 310. The indentation 330 may serve as a handle of the door. In this case, it is preferable that a front end of the extension portion 16*a* connected with the left frame 300 in the extension portion 16*a* of the front panel 16 is located at the inner side more inwardly than the rear frame connecting portion 320 to make a space into which a hand of a user may be inserted. That is, it is preferable that the width of the extension portion 16*a* connected with the left frame 300 in the extension portion 16*a* of the front panel 16 is smaller than the width of the left frame 300. Also, in this case, the first end of the left frame 300, that is, a transparent window connecting portion 310 starts at the position spaced apart from the front end of the extension portion 16*a* of the front panel 16 toward the inner side, is extended to a front end direction and tightly adhered to the inner surface of the extension portion 16*a*.

Meanwhile, as described above, the rear frame 200, the side frames 300 and 400, the upper frame 500 and the lower frame 600 may define a predetermined space, more particularly, edge portions of the frames 200, 300, 400, 500 and 600 and the panel assembly 10 may define a substantially sealed space. This space is foamed and filled with the thermal insulator 60, for example, polyurethane foam (PU foam), whereby the frame assembly 20 has predetermined insulation performance. For example, if the panel assembly 10 is not transparent, for example, if the panel assembly 10 is a touch panel, this insulation space may be filled with thermal insulators filled in the inner space of the panel assembly 10.

Next, the heating element 30 will be described in detail.

As described above, dew formation may occur at the connected portion 10*a* of the panel assembly 10 and the frame assembly 20 instead of the panel assembly 10 under a specific condition. Therefore, it is preferable that dew formation prevents from occurring at this connected portion than any other portions.

Dew formation may occur at the connected portion between the panel assembly 10 and the frame assembly 20 because the cool air is concentrated on the connected portion due to relatively vulnerable thermal insulation performance caused by a difference in thermal insulation performance between the panel assembly 10 and the frame assembly 20. Also, it is regarded that the portion where the spacer 18 of the panel assembly 10 is installed in the connected portion 10*a* between the panel assembly 10 and the frame assembly 20 is particularly vulnerable to thermal insulation performance.

For example, it is preferable that the heating element 30 is installed near the connected portion 10*a* between the panel assembly 10 and the frame assembly 20, that is, at the connected portion 10*a* or near the connected portion 10*a*. For example, as shown in FIG. 2, the heating element 30 may be installed in an area between the thermal insulator 60 and the panel assembly 10. That is, the heating element 30 may be provided between the thermal insulator 60 and the panel assembly 10 along a side of the inner area of the panel assembly 10. It is more preferable that the heating element 30 is installed to be close to the front surface of the door 7. This is because that the heating element 30 is installed at the position where the front portion of the door 7 may be heated because dew formation occurs at the front of the panel assembly 10, that is, at the front portion of the door 7. To this end, for example, as shown in FIG. 3, the heating element 30 may be provided on a rear surface of the front panel 16 of the panel assembly 10. In more detail, the heating element 30 may be provided at a position of the rear surface of the front panel 16, which is inclined toward the connected portion 10*a*.

For example, the heating element 30 may be installed at an area of the frame assembly 20 connected to the panel assembly 10. In more detail, the heating element 30 may be provided on an inner surface or an outer surface of the first end 220 of the rear frame 200 or may be provided on an inner surface or an outer surface of the panel connecting portion 310 of the side frame 300. That is, the heating element 30 may be provided on at least one 'B' of the inner surface and the outer surface of the front and rear ends 220 and 310 of the frame assembly 20. This is because that the portion B is a portion where the front and rear ends of the frame assembly 20 are mainly connected to the panel assembly 10.

Meanwhile, as described above, since the spacer 18 becomes the portion vulnerable to thermal insulation, the heating element 30 may be installed at the portion where the spacer 18 is installed, that is, inside the spacer 18, or may be installed in contact with the spacer 18 or near the spacer 18. However, if the heating element 30 is inside the spacer 18, a moisture absorbent of the spacer 18 is detached therefrom, whereby dew condensation may occur inside the panel assembly 10. Also, since the spacer 18 is located inside the panel assembly 10, if the heating element 30 is installed inside the spacer 18 or in contact with the spacer 18, a separate mounting structure is required and a separate line is required. Therefore, considering these matters, it is more preferable that the heating element 30 is installed along the edge of the panel assembly 10. If the heating element 30 is installed along the edge of the panel assembly 10, it is advantageous that the heating element 30 is installed near the spacer 18 and at the same time the installation structure is simple.

Meanwhile, as described above, the heating element 30 is, but not limited to, preferably installed near the connected portion 10*a* between the panel assembly 10 and the frame assembly 20. Even though the heating element 30 is a little spaced apart from the connected portion 10*a*, the heating element 30 may be installed at any position on the panel assembly 10 if heat is transferred to the connected portion 10*a* to prevent dew formation from occurring. That is, the position corresponds to the position where the heating element 30 transfers heat to the connected portion 10*a* to prevent condensation from occurring. For example, the heating element 30 may be provided on at least one of inner and outer surfaces of the extension portion 16*a*, that is, the edge of the front panel 16 of the panel assembly 10.

Meanwhile, the heating element 30 may be provided to heat the connected portion only between the panel assembly 10 and the frame assembly 20. Therefore, a pre-heating type hot wire having less power consumption may be used as the heating element 30. Therefore, it is preferable that the heating element 30 may be provided in a hot wire type to surround the edge of the panel assembly 10. That is, it is preferable that the heating element 30 is a hot wire and has a shape corresponding to the shape of the edge of the panel assembly 10. If the entire panel assembly is heated, power consumption of about 60 W or more is required. However, since the connected portion between the panel assembly 10 and the frame assembly 20 is heated in this embodiment, power consumption of 7 W or less is required. Therefore, power consumption may be lowered to ⅛.

For example, since the side frames 300 and 400 are located toward the rear at the edge of the extension portion 16*a* of the front panel 16, the side frames 300 and 400 may not be seen to a user when the user looks at the door at the front of the door. Therefore, it is preferable that the front panel 16 of the panel assembly 10 is the same as the size of the door. Of course, the front panel 16 may be formed in a plane shape or a curved shape. Also, the panel connecting portion 310 may be connected to the rear surface of the extension portion 16*a* of the front panel 16. Therefore, the panel connecting portion 310 is not seen to the user. Also, the heating element 30 may be installed near the connected portion 10*a* between the panel assembly 10 and the frame assembly 20.

It is preferable that an opaque portion 50 is provided on an inner surface of the extension portion 16*a* of the front panel 16 to allow the heating element 30 not to be seen from the outside of the door and the heating element 30 is located on an inner surface of the opaque portion 50. The opaque portion 50 may easily be implemented by opaque printing of the inner surface of the front panel 16.

Meanwhile, the heating element 30 is preferably attached using an element having thermal conduction property such as Al tape. If the heating element 30 is attached by Al tape, the heating element 30 may temporarily be fixed during manufacture of the door, and may be prevented from being pushed into the panel assembly 10 during foaming of the thermal insulator 60. Also, heat of the heating element 30 may effectively be transferred to the periphery by the Al tape.

In more detail, heat generated from the heating element 30 may effectively be transferred to the peripheral portion of the front panel 16 through the attachment element having thermal conduction property. Also, if the panel assembly 10 is see-through, the heating element 30 may temporarily be fixed during manufacture of the door through the attachment element such as the Al tape. Therefore, the heating element 30 may be prevented from moving during injection of the thermal insulator 60. Of course, the thermal insulator may be prevented from being directly in contact with the heating element 30.

Also, the heating element 30 may tightly be fixed to the front panel 16 by pressure of the thermal insulator.

Meanwhile, as shown in FIG. 3, the side frames 300 and 400 of the door 7 may include heat bridges 315 and 415. The heat bridges 315 and 415 may be provided together with the heating element 30, or may be provided without heating element.

The heat bridges 315 and 415 transfer external heat transferred from the side frames 300 and 400 to the inner area of the panel assembly 10. That is, the heat bridges 315 and 415 may be provided to transfer heat toward the connected portion 10*a* which is vulnerable to thermal insulation. The cool air inside the refrigerator may be transferred near the connected portion 10*a* through the spacer 18. Therefore, the heat bridges 315 and 415 may be heated through heat of the external air.

Figure 5:
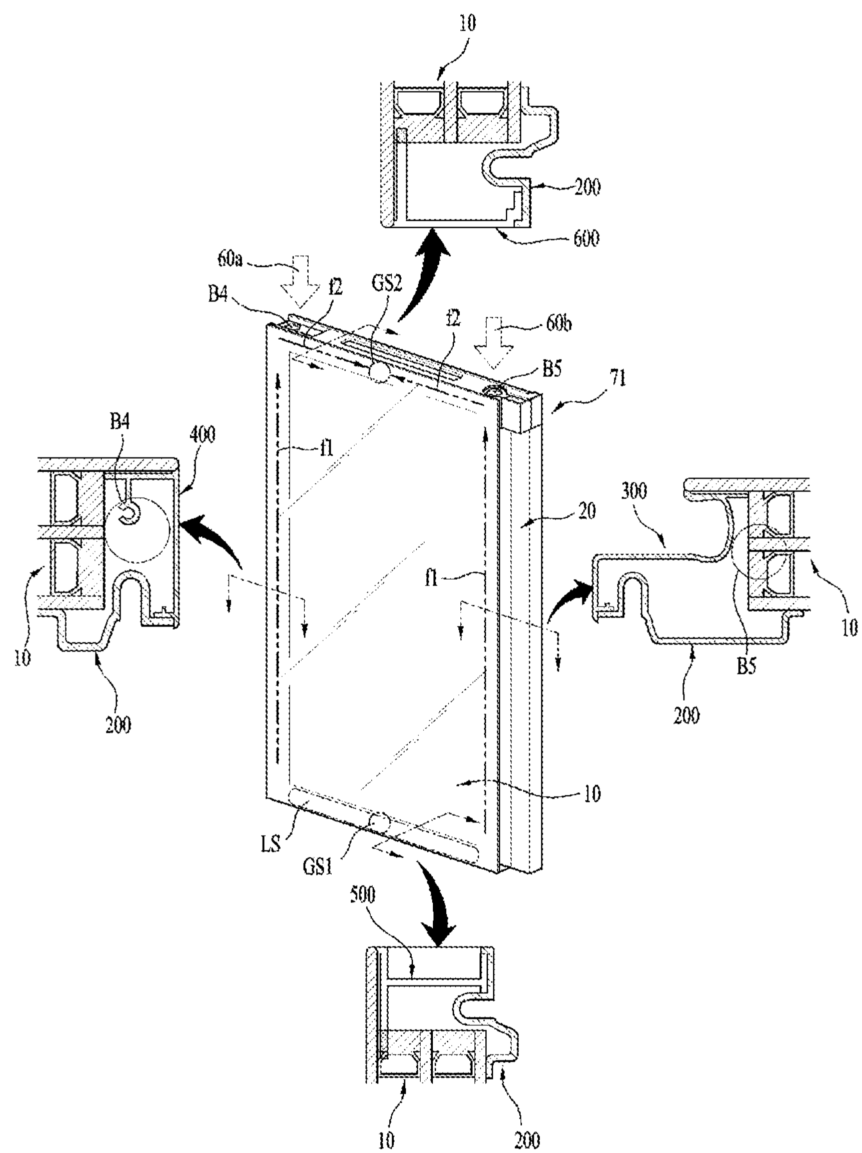
FIG. 5 is a perspective view illustrating movement of a foaming agent during injection of the foaming agent to a door of FIG. 1.

A method for manufacturing a door according to the present invention will be described with reference to FIGS. 4 and 5.

Foaming quality is affected by a length of a foaming path, a shape of the foaming path, a period change of the foaming path shape, and a filling time. That is, if the foaming path is long or a sectional area of the foaming path is small, foaming resistance is increased and the filling time is also increased in accordance with the increase of the foaming resistance. Therefore, the foaming agent may not be fully filled or material property value such as mechanical strength and thermal insulation performance may not be uniform per foaming period and deviation may occur. Also, deviation of the material property value occurs per foaming period even in the case that there is a period change in the foaming path shape.

Considering this, the method for controlling the door according to the present invention will be described as follows. For convenience, foaming injection holes B4 and B5 are respectively provided at both ends of the lower surface of the frame assembly 20.

First of all, the panel assembly 10 and the frame assembly 20 are temporarily assembled to make a temporary assembly door 71, and a thermal insulator is injected and foamed through the foaming injection holes B4 and B5 of the temporary assembly door 71, whereby the door is manufactured.

In more detail, the second frames 300, 400, 500 and 600 are assembled. That is, the upper deco 500 and the lower deco 600 are fixedly inserted into the left deco 300 and the right deco 400 to make a temporarily assembled frame assembly 20. Then, the panel assembly 10 is temporarily fixed to the temporarily assembled frame assembly 20 by a double-sided tape, and the first frame 200 is inserted thereto, whereby the temporary assembly door 71 is made. It is preferable that the temporary assembly door 71 is arranged vertically. That is, it is preferable that the upper surface of the temporary assembly door 71 is arranged in a ground direction, whereby the foaming injection holes B4 and B5 provided on the lower surface of the frame assembly 20 are arranged on the upper portion of the temporary assembly door 71. In this state, a thermal insulator 60*a* of a foaming agent state is injected through the foaming injection holes B4 and B5 of the frame assembly 20 for a predetermined time.

The temporary assembly door 71 is arranged vertically to inject the foaming agent to the foaming injection holes B4 and B5 for the following reasons. Even in the case that the foaming injection holes B4 and B5 are arranged on the upper surface or the lower surface of the temporary assembly door 71, if the foaming agent is injected in a state that the temporary assembly door 71 is arranged horizontally, foaming quality may relatively be deteriorated. If the foaming agent is injected in a state that the temporary assembly door 71 is arranged horizontally, the foaming agent injected to the foaming injection holes B4 and B5 is expanded while moving along the foaming path from the foaming injection holes B4 and B5. That is, the foaming agent is expanded while moving to a portion GS2 close to the foaming injection holes B4 and B5, and is also expanded when moving to a portion GS1 far away from the foaming injection holes B4 and B5. This is because that the foaming agent moves horizontally without being affected by gravity. Therefore, the foaming agent injected at the portion GS1 farthest away from the foaming injection holes B4 and B5 is finally expanded and coagulated, and a gas trap occurs there. Also, the foaming agent injected even at the portion GS2 close to the foaming injection holes B4 and B5 is expanded and coagulated, whereby a gas trap occurs. Therefore, if the foaming agent is injected in a state that the temporary assembly door 71 is arranged horizontally, the foaming path is narrow and the gas trap occurs at two portions by means of horizontal movement of the foaming agent, whereby two air vent holes are required. Also, incomplete filling of the foaming agent may occur due to the gas trap and path resistance.

However, even in the case that the foaming injection holes B4 and B5 are arranged on the upper surface or the lower surface of the temporary assembly door 71, if the foaming agent is injected in a state that the temporary assembly door 71 is arranged vertically, occurrence of the gas trap may be minimized and foaming quality may be improved. A foaming procedure corresponding to the case where the foaming agent is injected in a state that the temporary assembly door 71 is arranged vertically will be described as follows.

The foaming agent injected to the two foaming injection holes B4 and B5 moves to a half of all of the foaming paths. Also, the foaming agent 60*a* injected from the respective foaming injection holes B4 and B5 moves along gravity and is collected on the lower surface LS. The foaming agent collected on the lower surface LS is expanded while upwardly moving along a vertical path f1. The foaming agent moving to the upper portion is expanded while moving along a horizontal path f2 and finally is fully filled in the foaming space. If the foamed thermal insulator is coagulated, the manufacture of the door is finally completed. Therefore, if the foaming agent is injected in a state that the temporary assembly door 71 is arranged vertically, the gas trap may occur at only the portion GS2 where foaming is finally completed. As a result, one air vent hole is required, and incomplete filling of the foaming agent may be avoided effectively.

Moreover, if the foaming agent is injected in a state that the temporary assembly door 71 is arranged vertically in the same manner as the embodiment according to the present invention, the following advantages are obtained. That is, if a left and right width FW1 of the frame assembly 20 is relatively small, for example, 35 mm or less, the foaming agent injected to the foaming injection holes B4 and B5 stained in the inner side of the frame assembly 20 while moving to the lower portion, whereby it is predicted that there may be a problem in foaming quality. However, unlike the prediction, even though the injected foaming agent is partially stained in the inner side of the frame assembly 20, there is no problem in foaming quality. In this case, the foaming agent moving to the bottom of the frame assembly without being stained in the inner side of the frame assembly 20 and the foaming agent stained in the inner side of the frame assembly 20 are together foamed to enable uniform foaming. That is, if the foaming agent is foamed vertically, a part of the foaming agent is stained in the inner side of the frame assembly 20 using resistance caused by viscosity of the foaming agent, and the other of the foaming agent reaches the lower surface LS, whereby it is advantageous that foaming is simultaneously performed at the vertical portion and the lower portion to enable uniform foaming.

Also, if the two foaming injection holes B4 and B5 are used like this embodiment, the foaming path is substantially reduced to a half and the shape change of the foaming path is reduced to a half. Also, the filling time is reduced. Therefore, incomplete filling of the foaming agent may be avoided, and deviation of the material property value such as thermal insulation performance and coupling rigidity may be minimized.

Meanwhile, although the foaming injection hole B4 is located at both ends of the lower surface of the frame assembly 20 in the aforementioned embodiment, the present invention is not limited to the aforementioned embodiment, and one foaming injection hole may be provided. If one foaming injection hole is provided, that is, if one foaming injection hole on the upper surface of the frame assembly 20 is provided, since the foaming path becomes the space formed by the frame assembly, the foaming path is relatively long and filling time is relatively long. Also, sides of the frame assembly 20, that is, left side, right side, upper surface and lower surface have similar sectional shapes, which are not completely the same as one another. This is because that the parts installed in the corresponding space are different from one another. For example, structures of the space where electronic units are installed, the space where hinge members are coupled, and the portion coupled to the main door cannot be completely the same as one another. Therefore, although the panel assembly 10 and the frame assembly 20 are provided, their detailed shapes and dimensions may be different from each other (see sectional views of left side, right side, upper surface and lower surface of FIG. 5). Therefore, as described above, if one foaming injection hole is provided on the lower surface of the frame assembly 20, it is preferable to select a position where foaming quality can be maximized. For example, as shown in FIG. 5, if a handle is provided at one side of the frame assembly 20, it is preferable to select the foaming injection hole B4 of the end of the opposite side.

The present invention is not limited to the aforementioned embodiment, and modifications can be made in the present invention by the person with ordinary skill in the art to which the present invention pertains, within the scope of the present invention. For example, the present invention may be applied to the door having no panel assembly 10, for example, the main door (see 5 of FIG. 1). The door will be described with reference to FIG. 1. In case of the main door 5, there is no panel assembly 10. In view of foaming, the substantial structure of the main door 5 is the same as the frame assembly 20 of the sub door 7. The main door 5 has a center portion 52 which is opened, and has an edge surrounding the center portion 52, that is, a support portion 54, and a thermal insulator is received in the space defined by the support portion 54. The support portion 54 has predetermined rigidity to allow the main door 5 to be rotatably connected with the cabinet 1 of the refrigerator, and has predetermined thermal insulation performance to allow the cool air inside the refrigerator not to leak out. Since the support portion 54 of the main door 5 is opened, the support portion 54 has a width which is relatively small. Therefore, the foaming path may be small and foaming resistance may be great. In this respect, the foaming injection hole to which the thermal insulator is injected is provided on at least one of the ends of the upper surface, the lower surface, the left side and the right side of the main door 5, and it is preferable that the foaming agent is injected after the main door 5 is arranged vertically in a temporary assembly state. Since the foaming principle is the same as that of the sub door 7, its detailed description will be omitted.

Also, although the size of the main door 5 is the same as that of the sub door 7 in the aforementioned embodiment, the present invention is not limited to the aforementioned embodiment. For example, the present invention may be applied to even a case where the sub door 7 is smaller than the main door 5.

Figure 6:
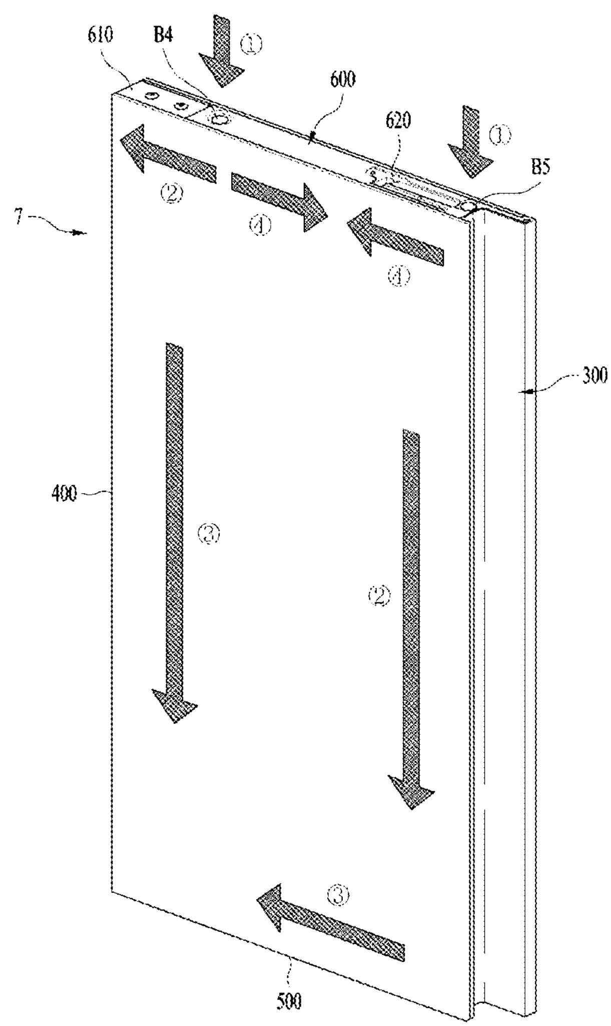
FIG. 6 is a perspective view illustrating a moving direction of a foaming injection hole and a foaming agent in a door according to one embodiment of the present invention.
Figure 7:
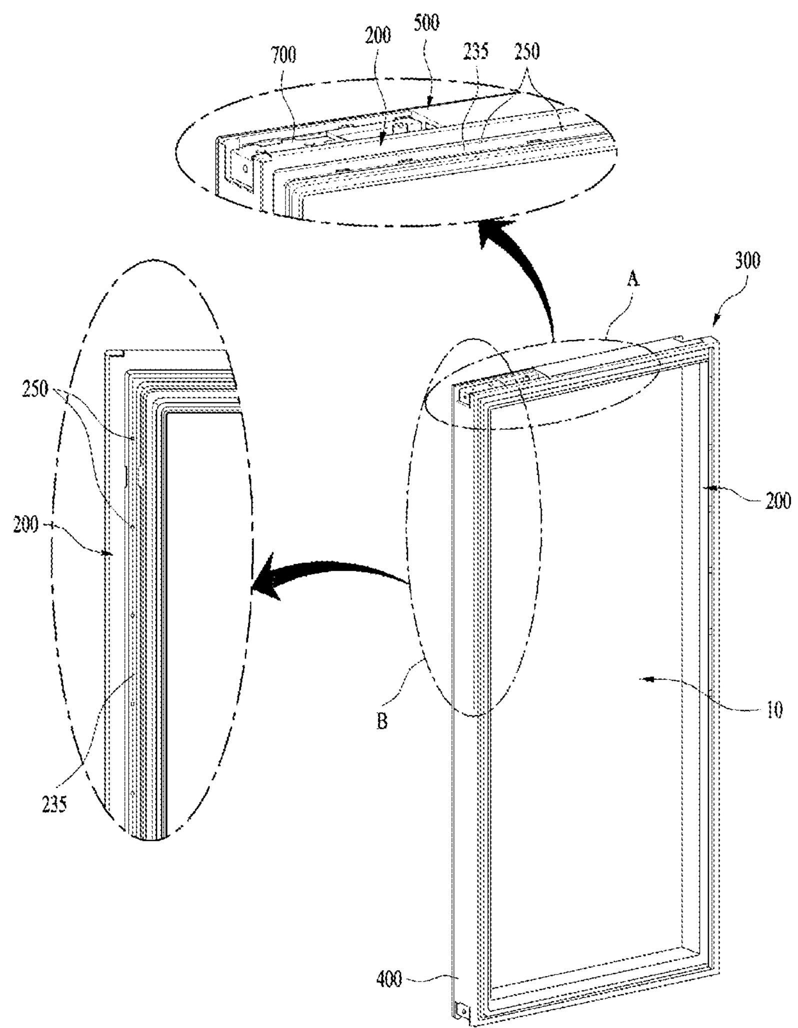
FIG. 7 is a perspective view illustrating arrangement of vent holes at a door shown in FIG. 6.

Hereinafter, the foaming injection hole, a movement direction of the foaming agent, and an air discharge relation for active movement of the foaming agent will be described in detail with reference to FIGS. 6 and 7. The position of the foaming injection hole in this embodiment may be a little different from the position of the foaming injection hole of the aforementioned embodiment.

Referring to the drawings, the foaming agent is injected to the first injection hole B5 and the second injection hole B4. At this time, the pressure of the foaming agent injected to the first injection hole B5 may be different from the pressure of the foaming agent injected to the second injection hole B4. That is, the foaming agent injected to the first injection hole B5 through which the foaming agent moves to a relatively wide space may be injected at relatively high pressure.

The moving path of the foaming agent will be described with reference to FIG. 6. The foaming agent injected to the first injection hole B5 is injected to the foaming space formed by the side frame 300 and the panel assembly 10. Then, the foaming agent moves to the foaming space formed by the lower frame 600 and the panel assembly 10.

The foaming agent injected to the second injection hole B4 is first injected to the foaming space formed by the lower frame 600 and the panel assembly 10 and then moves to the foaming space formed by the side frame 400 and the panel assembly 10.

The foaming agents simultaneously injected to the first injection hole B5 and the second injection hole B4 come across each other at the foaming space formed by the upper frame 500 and the panel assembly 10 or the foaming space formed by the side frame 400 and the panel assembly 10.

Afterwards, after the foaming agent is fully filled in the foaming spaces formed by the upper frame 500 and the side frame 400 and the side frame 300, the foaming agent may finally be filled in the space formed by the lower frame 600 and the panel assembly 10. Of course, if the foaming agent is fully filled, the foaming injection holes B4 and B5 may be blocked by a separate element such as an injection cover.

In this case, the filling direction of the first injection hole B5 may be the same as a length direction of the side frame 300. It is preferable that the filling direction of the first injection hole B5 is the same as the length direction of the side frame 300. That is, the moving direction of the foaming agent injected through the first injection hole B5 is maintained in the same manner as the length direction of the side frame 300 without being changed. Of course, the moving direction of the foaming agent may be changed later.

It is preferable that the filling direction of the second injection hole B4 is the same as that of the side frame 400. However, although the first injection hole B5 is located at the direct upper portion or direct lower portion of the side frame 300, it is preferable that the second injection hole B4 is located at the position inclined to one side from the direct upper portion or direct lower portion of the side frame 400.

That is, the foaming agent injected through the second injection hole B4 does not first move to the side frame 400 and flows along the lower frame 600 located to be orthogonal to the side frame 400 and finally moves along a length direction of the side frame 400.

In this case, a difference between the first injection hole and the second injection hole may be caused by a sectional difference of the foaming spaces of the side frames 300 and 400. That is, the injection hole is preferably provided at the direct upper portion or the direct lower portion of the length direction of the side frame 300 having a greater section, and the injection hole is preferably provided at one side (inclined toward the center of the door) inclined from the direct upper portion of the direct lower portion of the length direction of the side frame 400 having a smaller section.

Of course, as described above, an injection pressure at the first injection hole B5 becomes greater, and more portion of the foaming space is filled with the foaming agent substantially injected through the first injection hole B5. For example, the foaming agent injected to the first injection hole B5 may be 70%, and the foaming agent injected to the second injection hole B4 may be 30%.

Meanwhile, the rear frame 200 is preferably provided with vent holes 250 formed to discharge the air remaining at the inner side of the sub door 7 during injection of the foaming agent. The vent holes 250 may be formed at a gasket mounting groove 235 formed for mounting of the gasket 40 along the rear frame 200.

The gasket mounting groove 235 may be formed to be recessed along the circumference of the rear frame 200, and the vent holes 250 may be formed on the gasket mounting groove 592 at certain intervals. After the foaming agent is fully filled, a sub door gasket 591 is mounted on the gasket mounting groove 235. Therefore, the vent holes 250 may be covered by the sub door gasket 591 and is not exposed to the outside.

Meanwhile, the vent holes 250 may be formed at some area of the gasket mounting groove 235. The vent holes 250 may be formed at certain intervals along areas A and B where the upper frame 500 and the side frame 400 are arranged as shown in FIG. 8. Particularly, the vent holes 250 may be formed at certain intervals based on a corner where the upper frame 500 and the side frame 400 come across each other. Therefore, the air inside the sub door 50 may be discharged from an area adjacent to the point where the foaming agent injected to the first injection hole B5 and the foaming agent injected to the second injection hole B4 come across each other, and the air continues to be discharged out until the foaming agent is fully filled.

In other words, it is preferable that the vent holes 250 are formed at the corner portion of the side frame 400 and the upper frame 500 in a diagonal direction of the first injection hole B4 having the greater foaming pressure.

Meanwhile, the lower frame 600 may be provided with a hinge mounting portion 610. Therefore, the second injection hole B4 is provided to be more inclined toward the center portion of the door than the hinge mounting portion 610. That is, it is preferable that a foaming sectional area of the side frame 400 corresponding to the hinge mounting portion 610 is smaller than a foaming sectional area of the side frame 30 at the opposite position.

Also, the lower frame 600 may be provided with a sensor mounting portion 620. A sensor for sensing approach of a human body or a sensor for sensing a touch input of a user or knock input to the panel assembly 10 may be mounted on the sensor mounting portion 620. Therefore, it is preferable that the first injection hole B5 is provided to be more inclined toward the side of the door than the sensor mounting portion 620.

That is, when foaming is performed after the door is arranged reversely, the foaming agent injected through the first injection hole B5 may initially move to the lower portion vertically (while the side frame 300 is filled with the foaming agent) and then move to the second injection hole B4 horizontally. The foaming agent injected through the second injection hole B4 may initially move to the first injection hole B5 and then move to the lower portion vertically (while the side frame 400 is filled with the foaming agent).

The injection cover which blocks the foaming injection holes through which the foaming agent is completely injected may be coupled with the lower frame. Therefore, the foaming injection holes are blocked at the outside of the door. Of course, the vent holes may be blocked. As a result, thermal insulation performance of the door can be obtained and at the same time esthetic appearance can be provided.

The present invention is not limited to the aforementioned embodiments, and modifications can be made in the present invention by the person with ordinary skill in the art to which the present invention pertains, within the scope of the present invention.

INDUSTRIAL APPLICABILITY

Industrial applicability is disclosed in the detailed description of the present invention.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:

a cabinet having a storage chamber;

a main door rotatably coupled to the cabinet and configured to open and close the storage chamber; and a sub door rotatably coupled to the main door;

wherein the sub door includes:

a panel assembly that is in contact with a frame assembly having an opening; and a thermal insulator foamed in a foaming space defined by the frame assembly, wherein the panel assembly includes:

a front panel made of a transparent material; and an insulation panel spaced apart from the front panel and that covers the opening;

wherein the frame assembly includes:

a first injection hole configured to inject foaming agent into the foaming space and positioned on a first surface of the frame assembly;

a second injection hole configured to inject the foaming agent into the foaming space and spaced apart from the first injection hole on the first surface of the frame assembly;

a gasket installed on a second surface of the frame assembly; and vent holes formed on the second surface of the frame assembly and spaced apart from the first and second injection holes, wherein the first surface is provided at an upper portion or a lower portion of the frame assembly, and the second surface is provided at a rear portion of the frame assembly.

2. The refrigerator of claim 1, wherein the frame assembly includes a rear frame, first and second side frames, an upper frame and a lower frame, and wherein the lower frame or the upper frame includes the first surface.

3. The refrigerator of claim 2, wherein the first side frame and a first lateral side of the panel assembly defines a first foaming path, and the second side frame and a second lateral side of the panel assembly defines a second foaming path, and wherein at least a portion of the foaming agent injected from the first injection hole flows along the first foaming path, and at least a portion of the foaming agent injected from the second injection hole flows along the second foaming path.

4. The refrigerator of claim 3, wherein the second injection hole is partially overlapped with the panel assembly.

5. The refrigerator of claim 4, wherein the second side frame includes an indentation that serves as a handle.

6. The refrigerator of claim 2, wherein the rear frame includes the vent holes.

7. The refrigerator of claim 6, wherein the rear frame includes a gasket mounting groove on which the gasket is mounted and formed to be recessed along a circumference of the rear frame, and wherein the vent holes are formed at the gasket mounting groove.

8. The refrigerator of claim 2, wherein the lower frame includes a hinge mounting portion, and the first injection hole is positioned between a center portion of the sub door and the hinge mounting portion.

9. The refrigerator of claim 1, wherein the second injection hole is disposed opposite the second injection hole with respect to a center portion of the first surface.

10. The refrigerator of claim 1, wherein the sub door further includes injection covers to cover the first and second injection holes.

11. A refrigerator comprising:

a cabinet having a storage chamber;

a main door rotatably coupled to the cabinet and configured to open and close the storage chamber; and a sub door rotatably coupled to the main door;

wherein the sub door includes:

a frame assembly;

a panel assembly that is in contact with the frame assembly; and a thermal insulator foamed in a foaming space defined by the frame assembly, wherein the frame assembly includes:

a first injection hole configured to inject foaming agent into the foaming space and positioned on a first surface of the frame assembly;

a second injection hole configured to inject the foaming agent into the foaming space and spaced apart from the first injection hole on the first surface of the frame assembly;

a gasket installed on a second surface of the frame assembly; and vent holes formed on the second surface of the frame assembly and spaced apart from the first and second injection holes, wherein the first surface is provided at an upper portion or a lower portion of the frame assembly, and the second surface is provided at a rear portion of the frame assembly.

12. The refrigerator of claim 11, wherein the frame assembly includes a rear frame, first and second side frames, an upper frame and a lower frame, and wherein the lower frame or the upper frame includes the first surface.

13. The refrigerator of claim 12, wherein the first side frame and a first lateral side of the panel assembly defines a first foaming path, and the second side frame and a second lateral side of the panel assembly defines a second foaming path, and wherein at least a portion of the foaming agent injected from the first injection hole flows along the first foaming path, and at least a portion of the foaming agent injected from the second injection hole flows along the second foaming path.

14. The refrigerator of claim 12, wherein the rear frame includes a gasket mounting groove on which the gasket is mounted and formed to be recessed along a circumference of the rear frame, and wherein the vent holes are formed at the gasket mounting groove.

15. A refrigerator comprising:

a cabinet having a storage chamber;

a main door rotatably coupled to the cabinet and configured to open and close the storage chamber, and including a frame assembly with an opening;

a thermal insulator foamed in a foaming space that is defined by the frame assembly; and a sub door rotatably coupled to the main door and configured to open and close the opening, wherein the frame assembly includes:

a first injection hole configured to inject foaming agent into the foaming space and positioned on a first surface of the frame assembly;

a second injection hole configured to inject the foaming agent into the foaming space and spaced apart from the first injection hole on the first surface of the frame assembly;

a gasket installed on a second surface of the frame assembly; and vent holes formed on the second surface of the frame assembly and spaced apart from the first and second injection holes, wherein the first surface is provided at an upper portion or a lower portion of the frame assembly, and the second surface is provided at a rear portion of the frame assembly.

16. The refrigerator of claim 15, wherein the frame assembly constitutes an external appearance of the main door, and includes a rear frame, first and second side frames, an upper frame and a lower frame, wherein the lower frame or the upper frame includes the first surface.

17. The refrigerator of claim 16, wherein the foaming space includes a first foaming path defined by the first side frame and a second foaming path defined by the second side frame, and wherein the first and second foaming paths are extended in up and down directions.

18. The refrigerator of claim 17, wherein at least one of the first and second injection holes are overlapped with the first and second foaming paths.

19. The refrigerator of claim 16, wherein the rear frame includes a gasket mounting groove on which the gasket is mounted, and wherein the vent holes are formed at the gasket mounting groove.

20. The refrigerator of claim 16, wherein the main door is rotatably connected to the cabinet by a hinge structure, wherein the lower frame or the upper frame includes a hinge mounting portion to which the hinge structure is connected, and wherein the first injection hole is closer to the hinge mounting portion than the second injection hole.

21. The refrigerator of claim 20, wherein a distance between the first injection hole and the hinge mounting portion is less than a distance between the first injection hole and a center portion of the first surface.

22. The refrigerator of claim 15, wherein an upper and lower width of the main door is greater than a left and right width of the main door.

23. The refrigerator of claim 15, wherein at least one of the first and second injection holes are overlapped with an edge of the frame assembly.

24. The refrigerator of claim 15, wherein the frame assembly includes a recessed indentation that serves as a handle.

25. The refrigerator of claim 24, wherein the second injection hole is closer to the recessed indentation than the first injection hole.

26. The refrigerator of claim 15, wherein at least one of the vent holes is closer to a corner of the frame assembly than the first and second injection holes.

27. The refrigerator of claim 15, wherein the second injection hole is disposed opposite the first injection hole with respect to a center portion of the first surface.

28. The refrigerator of claim 15, wherein the foaming agents are simultaneously injected to the first injection hole and the second injection hole.

29. The refrigerator of claim 15, wherein three or more vent holes are arranged in a row.

* * * * *